US007783752B2

(12) United States Patent
Parikh et al.

(10) Patent No.: US 7,783,752 B2
(45) Date of Patent: Aug. 24, 2010

(54) AUTOMATED ROLE BASED USAGE DETERMINATION FOR SOFTWARE SYSTEM

(75) Inventors: Ashish Parikh, Issaquah, WA (US); Henry Lyons, Seattle, WA (US); Michael Van Snellenberg, Seattle, WA (US); Olga Ivanova, Redmond, WA (US); Rahul Chabukswar, Bellevue, WA (US); Rohan Lam, Fall City, WA (US)

(73) Assignee: Microsoft Corporation, Redmond, WA (US)

( * ) Notice: Subject to any disclaimer, the term of this patent is extended or adjusted under 35 U.S.C. 154(b) by 171 days.

(21) Appl. No.: 12/251,472

(22) Filed: Oct. 15, 2008

(65) Prior Publication Data
US 2010/0094991 A1  Apr. 15, 2010

(51) Int. Cl.
G06F 15/173 (2006.01)
(52) U.S. Cl. ........................ 709/224; 709/223; 709/218
(58) Field of Classification Search ................. 709/223, 709/224, 218, 217, 225; 702/188; 706/46; 715/501.1; 705/2; 707/5
See application file for complete search history.

(56) References Cited

U.S. PATENT DOCUMENTS

| 6,594,786 | B1 | 7/2003 | Connelly et al. |
| 6,978,257 | B1 | 12/2005 | Halbout et al. |
| 7,076,510 | B2 | 7/2006 | Brown |
| 7,174,379 | B2 | 2/2007 | Agarwal et al. |
| 7,203,623 | B2 | 4/2007 | Garcea et al. |
| 7,373,416 | B2 | 5/2008 | Kagan et al. |
| 2003/0145083 | A1* | 7/2003 | Cush et al. ................. 709/224 |
| 2004/0006546 | A1* | 1/2004 | Wedlake et al. ............... 706/46 |
| 2007/0113167 | A1* | 5/2007 | Kundu ..................... 715/501.1 |
| 2007/0118336 | A1* | 5/2007 | Parikh et al. ................. 702/188 |
| 2007/0299953 | A1* | 12/2007 | Walker et al. ............... 709/223 |
| 2008/0052393 | A1* | 2/2008 | McNaughton et al. ...... 709/224 |
| 2008/0270181 | A1* | 10/2008 | Rosenberg ..................... 705/2 |
| 2008/0281958 | A1* | 11/2008 | McKinnon et al. .......... 709/224 |
| 2009/0119280 | A1* | 5/2009 | Waters et al. .................. 707/5 |

OTHER PUBLICATIONS

"Understanding the server usage report", retrieved at <<http://technet2.microsoft.com/WindowsServerSolutions/SBS/ en/library/6df56b7b-bc91-4a03-9b84-2326ac6099f71033.mspx?mfr=true>>, Jul. 16, 2008, pp. 3.

"Server Performance Metrics", retrieved at <<http://www.uptimesoftware.com/metrics.php>>, Jul. 16, 2008, pp. 5.

(Continued)

Primary Examiner—Le Luu
(74) Attorney, Agent, or Firm—Russell S. Krajec; Krajec Patent Offices, LLC

(57) ABSTRACT

A usage data collection and evaluation mechanism may collect usage information from various sources and summarize the usage information to determine a role for a system. The role and usage information may be transmitted to a centralized server for aggregation and analysis. The collection and transmission of usage data may be governed by and conform to a privacy agreement and may be collected when an end user agrees to such collection. Role determination may be performed using data collected from a single device, multiple devices, or from a network monitoring system. The usage data collection and evaluation mechanism may determine an installed role base and any changes in the installed role base since a previous report.

20 Claims, 2 Drawing Sheets

OTHER PUBLICATIONS

"Teratrax", retrieved at <<http://www.teratrax.com/tpm/help/v40/agent/views.html>>, Jul. 16, 2008, pp. 2.

"Oracle® Enterprise Manager Metric Reference Manual", retrieved at <<http://download.oracle.com/docs/html/B12015_01/oracle_ias.htm>>, Jul. 16, 2008, pp. 15.

Shum, et al., "A Multi-Tiered Approach with Data Normalization to Analyzing CPU Metrics", retrieved at <<http://www.bmc.com/offers/performance/whitepapers/docs/2005/A_Multi_Tiered_Approach_With_Data_Normalization_To_Analyzing_CPU_Metrics.pdf>>, p. 14.

* cited by examiner

AUTOMATED ROLE BASED USAGE DETERMINATION FOR SOFTWARE SYSTEM

BACKGROUND

Software systems often may be used in different manners. For example, an operating system, application, or service may be installed and used for testing purposes, which may be a different use than if the same software system was used for everyday use. In many cases, the system may have a wide range of functions or capabilities, and each function may be used or exercised differently by different persons in different situations.

SUMMARY

A usage data collection and evaluation mechanism may collect usage information from various sources and summarize the usage information to determine a role usage for a system. The role usage information may be transmitted to a centralized server for aggregation and analysis. The collection and transmission of usage data may be governed by and conform to a privacy agreement and may be collected when an end user agrees to such collection. Role usage determination may be performed using data collected from a single device, multiple devices, or from a network monitoring system. The usage data collection and evaluation mechanism may determine an installed role base and any changes in the installed role base since a previous report.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
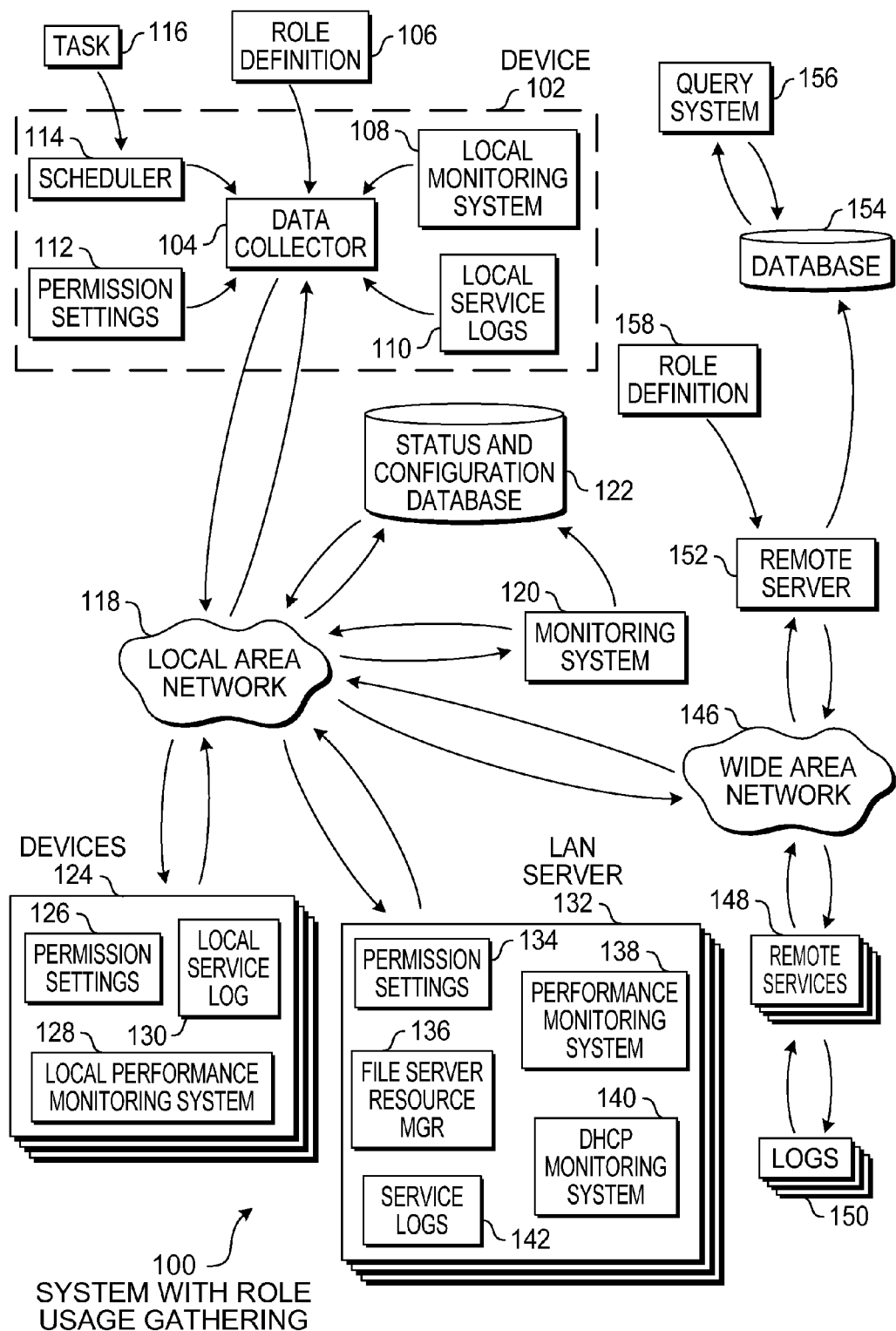
FIG. 1 is a diagram illustration of an embodiment showing a system with role usage gathering.

A usage data collection and evaluation mechanism may collect usage information and determine the usage for a specific role associated with a device and software operable on the device. The role may be collected by a centralized server that may monitor the roles for various purposes, including contract compliance, prioritization of future development, marketing, and other purposes.

A role may be a high level function or workload that may be performed by the device and the software operable on the device. In some instances, a role may be performed by multiple devices across a network. A role may be a business function that is performed by a device or group of devices, using one or more software and hardware components.

Data may be collected by monitoring individual devices. In some cases, a device may be instrumented for data collection while in other cases, data may be collected from preexisting sources, such as application logs and performance histories. In some embodiments, a centralized monitoring system may monitor and collect performance and configuration data for many devices on a network and store such data in a centralized database. In such embodiments, role determination data may be collected from the monitoring system rather than individual devices.

In some embodiments, a role may be performed by multiple devices acting together. In such a case, data may be collected from multiple devices and aggregated to determine role usage information.

The role usage information may be useful for a system administrator to monitor and configure software, devices, and networks to address the current or anticipated functions of devices in a network environment.

In some embodiments, the role usage information, along with configuration information and other data, may be transmitted to a software manufacturer or other organization. Such transfer of data may comply with an organization's privacy policy and may be subject to explicit approval from an end user. Personally Identifiable Information (PII) may be collected in instances where the end user has given explicit approval. In many embodiments, Personally Identifiable Information may be scrubbed or removed from any data collected prior to role determination so that PII could not be inadvertently transferred.

Throughout this specification, like reference numbers signify the same elements throughout the description of the figures.

When elements are referred to as being "connected" or "coupled," the elements can be directly connected or coupled together or one or more intervening elements may also be present. In contrast, when elements are referred to as being "directly connected" or "directly coupled," there are no intervening elements present.

The subject matter may be embodied as devices, systems, methods, and/or computer program products. Accordingly, some or all of the subject matter may be embodied in hardware and/or in software (including firmware, resident software, micro-code, state machines, gate arrays, etc.) Furthermore, the subject matter may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. By way of example, and not limitation, computer readable media may comprise computer storage media and communication media.

Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by an instruction execution system. Note that the computer-usable or computer-readable medium could be paper or another suitable medium upon which the program is printed, as the program can be electronically captured, via, for instance, optical scanning of the paper or other medium, then compiled, interpreted, of otherwise processed in a suitable manner, if necessary, and then stored in a computer memory.

Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

When the subject matter is embodied in the general context of computer-executable instructions, the embodiment may comprise program modules, executed by one or more systems, computers, or other devices. Generally, program modules include routines, programs, objects, components, data structures, etc. that perform particular tasks or implement particular abstract data types. Typically, the functionality of the program modules may be combined or distributed as desired in various embodiments.

FIG. 1 is a diagram of an embodiment 100 showing a system with a role usage determination mechanism. Embodiment 100 is a simplified example of a network environment in which a data collector may determine if specific roles are being performed by an operating system, application, or other services operating on a local device or across a network. The role usage and configuration information may be transmitted to a remote server when the appropriate permissions allow such transfer of information.

The diagram of FIG. 1 illustrates functional components of a system. In some cases, the component may be a hardware component, a software component, or a combination of hardware and software. Some of the components may be application level software, while other components may be operating system level components. In some cases, the connection of one component to another may be a close connection where two or more components are operating on a single hardware platform. In other cases, the connections may be made over network connections spanning long distances. Each embodiment may use different hardware, software, and interconnection architectures to achieve the functions described.

Embodiment 100 is an example of a typical network environment. A local device 102 is connected to a local area network 118, and may communicate with a server 132 as well as various devices 124. An example of such an environment may be a business or other enterprise where users may share services provided from a server. Another example may be a home network where various computers may be connected together to share data files and have access to the Internet.

In different environments, software systems and devices may perform different roles. For example, an embodiment in a home with three computers may perform rudimentary file sharing and Internet access with simplified firewalls, while an embodiment in a financial institution may share access to large databases across many tens or hundreds of computer terminals with complex firewalls and authentication systems. Both examples may use the same underlying operating system, software components, and devices, but may use them in very different manners and with different frequency.

The role information may be useful in several different scenarios. For example, a system administrator within an organization may wish to monitor how the network is being used so that upgrades may be planned or resources reallocated to meet actual use. In another example, an application developer may wish to know which features of the application are being used during a beta test or after product release. In still another example, a marketing manager may wish to know if a demonstration copy of a software application or device is being lightly used for testing or for heavy production use. In yet another example, a software system or device may be sold on a pay-by-use basis and the role usage may be a factor in determining how much to charge under the contract.

In some cases, the role definition may change over time. For example, during a beta testing period, a relatively small number of instances of the device 102 may be heavily monitored and detailed role and configuration data may be collected on a frequent basis. After production release, much less information may be collected on a less frequent basis.

In one use scenario, an updated role definition may be sent to the device 102. The updated role definition may add new roles to monitor or may include additional configuration information to collect. As a troubleshooting mechanism, a more detailed role definition may be temporarily used to collect data. In some cases, an updated role definition may remove roles to monitor or data to collect.

The data collector 104 may collect various data from a local device 102, devices 124 and servers 132 on a local area network 118, as well as remote services 148 that are accessed across a wide area network 146. In some cases, the collected data may be sensitive or Personally Identifiable Information (PII). In embodiments where the data may be shared outside of an organization, such data may be scrubbed of any PII or otherwise made anonymous prior to sending the data to a collection server 152.

The data collector 104 may transmit data to a collection server 152 based on permission settings 112. The permission settings 112 may define what information, if any, may be shared outside of an organization. In some embodiments, the permission settings 112 may define what type of information may be collected on the device 102 and what information may be shared outside of the device 102. Any transmittal of data from the device 102 to another device, including the remote collection server 152 may be governed by the permission settings 112.

In some embodiments, permission settings may be attached to each device 124 and server 132, such as permission settings 126 and 134, respectively. In such embodiments, each device may have separate permission settings associated with the device, and those permission settings may permit or deny access to data collection for the device.

The device 102 may be any type of computing device. In some embodiments, the device 102 may be a computer workstation, server computer, laptop computer, or other general purpose computer. In other embodiments, the device 102 may be a device such as a portable scanner, telephony device, personal digital assistant, cellular telephone, or any other device on which a data collector 104 may operate. In some embodiments, the device 102 may be a virtual device.

In many embodiments, the device 102 may connect to a local area network 118 using Ethernet or other wired connection. In other embodiments, the device 102 may connect to a network using wireless technologies, including wireless data connection, cellular telephony, or other wireless communication technologies.

Some embodiments of the device 102 may have a general purpose processor that may execute a software application that performs some or all of the functions of the data collector 104. In some embodiments, some or all of the functions of the data collector 104 may be performed in hardware, firmware, or using technologies such as field programmable gate arrays (FPGA).

The data collector 104 may receive a role definition 106. The role definition 106 may include the definition of one or more roles and the data points that are used to determine role usage. The role definition 106 may define a business function that may be performed by the device 102. In some cases, a business function may be performed by multiple software and hardware components. Some such cases may include components that are accessed over a network connection and may be performed by two or more different devices.

For example, a business function may be a web server. In a simple role definition, a role usage may qualitatively determine if the web server is being used in a high, medium, or low usage. In order to determine the usage, a role definition may retrieve the number of GET requests per time period. In such an example, a log of GET requests may be kept by the web server. By analyzing the data log, a data collector 104 may be able to determine the average number of GET requests per day or hour, and compare that number to determine the role usage of high, medium, or low usage.

In some cases, a business function may be performed by multiple software components that may operate on two or move different devices. For example, a line of business application may have a locally executing component that may provide a web based and client based interfaces. A web server on a second device may provide the web portal and a database system on a third device may provide database services. In such a case, each device may perform a portion of the overall business function, and in order to determine the usage of the specific business function, data may be gathered from each device.

In many embodiments, a role usage may be determined in a qualitative manner. A heuristic may be used to determine a qualitative summary of one or more quantitative data values. In some embodiments, the data collector 104 may determine both qualitative and quantitative values associated with a role usage and transmit both qualitative and quantitative values to a remote server.

In many embodiments, a task 116 may be defined and launched by a scheduler 114. The task 116 may involve launching the data collector 104 at various times. In many embodiments, the scheduler 114 may be configured to cause the data collector 104 to be run at a predetermined cycle. A typical cycle may be every four hours, every day, once a week, or some other time. In some cases, the cycle may be a matter of minutes.

Many embodiments may have a predefined cycle as well as a jitter associated with the cycle. The jitter may have the data collector 104 perform its operation at varying times so that the collected data does not adversely affect other operations that execute on a schedule and gives more normalized results. For example, a scheduler 114 may be configured to launch the data collector 104 with a period of 6 hours with a 0-6 hour jitter. Such an example may cause the data collector 104 to randomly launch every 0-12 hours.

The data collector 104 may query a local monitoring system 108 to gather performance and configuration information. The local monitoring system 108 may be a process that operates to monitor the data points collected by the data collector 104. In some cases, the local monitoring system 108 may collect data on individual events and produce summary statistics on a continuous or ongoing basis. When the data collector 104 queries the local monitoring system 108, the local monitoring system 108 may return the current data that has been collected.

In many embodiments, the local monitoring system 108 may be an application or service that is specifically configured to operate in conjunction with the data collector 104. In other embodiments, the local monitoring system 108 may be a general purpose monitoring system that may monitor various performance and configuration aspects of the device 102 for administrative and maintenance purposes. In such an embodiment, the data collector 104 may query some available data points and perform some normalization, conversion, or other processing to determine a useful statistic for role usage determination.

The local monitoring system 108 may be a daemon or other process that is launched when an event occurs. In other embodiments, the local monitoring system 108 may be a service that monitors and logs events or changes in state. Many different technologies may be employed to monitor a local system, and such technologies may vary based on the available hardware and software components and other functions available on the device 102.

In embodiments where the data collector 104 may collect data from other devices 124 or other servers 132 across a local area network 118, each device or server may have a local performance monitoring system 128 and 138, respectively. In some embodiments, one or more of the devices 124 may be a virtual device.

The data collector 104 may evaluate local service logs 110 to determine various statistics and data point values. In the example of the web server above, the data collector 104 may analyze a web server log to determine how many GET requests were processed over a period of time. Many different applications, services, and functions may produce service logs, and such logs may be read and analyzed by the data collector 104. When the data collector 104 gathers data from other devices 124 and other servers 132, each device or server may have a local service log 130 and 142, respectively.

In some embodiments, a specific business function may have a monitoring system dedicated to the business function. For example, Dynamic Host Configuration Protocol (DHCP) may be a business function that assigns network connection parameters to other devices on a network. As an example, the server 132 may have a DHCP monitoring system 140 that may be queried to determine DHCP usage parameters. The DHCP monitoring system 140 may be a service used to manage DHCP operations on the server 132, or may be a separate monitoring service that monitors and logs DHCP operations.

In a similar example, a file server resource manager 136 may perform various management functions for file servers, including setting up and managing file systems, establishing quotas on folders or volumes, screening files, and reporting on file system usage. The file server resource manager 136 may be an administrative tool that operates on a server and may manage file storage on that server or multiple servers, storage area networks, or other storage mechanisms. The data collector 104 may be configured to query the file server resource manager 136 to retrieve usage and configuration information.

In some embodiments, a monitoring system 120 may collect performance, operational, and configuration information from multiple devices across a local area network 118. The monitoring system 120 may monitor the operations of many different devices and provide detailed reports that enable an administrator to troubleshoot problems, receive alerts, and manage the configuration and performance of many different devices. The monitoring system 120 may manage and update a status and configuration database 122. In some embodiments, the data collector 104 may query the monitoring system 120 through an application programming interface (API)

or some other mechanism. In other embodiments, the data collector 104 may be capable of querying the status and configuration database 122 directly.

The data collector 104 may gather usage and configuration data relating to the access and use of remote services 148. Remote services 148 may be any service that may be accessed over a wide area network 148, such as web based and other services available over the Internet. In some cases, each device through which a remote service 148 is accessed may keep a local service log 110 that includes entries for each interaction or session with a remote service. In some embodiments, the remote services 148 may maintain a log 150 of access. In such an embodiment, the data collector 104 may retrieve data from the logs 150.

In embodiments where the permission settings 112 permit, the data collector 104 may send role usage and configuration information to a remote server 152. The remote server 152 may store the role usage and configuration information in a database 154 such that a query system 156 may access and use the data from the database 154.

In such embodiments, the remote server 152 may be a server operated by a third party, such as an application development company or data collection company. The third party may be granted permission to receive and use the data collected by the data collector 104. In many cases, the transmitted data may be scrubbed to remove any personally identifiable information (PII) or other sensitive information. In cases where PII is transferred to the remote server 152, such data may be transmitted and used under an agreement where permission has been given by the data owners.

The role definition 106 may be periodically updated or changed. When the data collector 104 launches, the data collector 104 may perform a query to the remote server 152 to determine if the locally stored role definition 106 is current. If the role definition 106 is not current, the data collection 104 may request that the remote server 152 transmit an updated role definition 158. Such a mechanism may enable the role definition 106 to be expanded, contracted, or changed as desired.

In many embodiments, the data transmitted to the remote server 152 may include configuration information about the device 102 or other devices 124 or servers 132 from which data may be collected and roles determined. The configuration information may include hardware and software configuration information about the device on which the web server operates.

The role definition 106 may define the parameters to be collected, which may include hardware information and configuration settings, such as processor type and speed, network connection type and speed, memory, and data storage information.

The role definition 106 may define software configuration information such as operating system information, services and applications that are operating or available on a device or network, configuration settings for the services and applications, and other software information.

Figure 2:
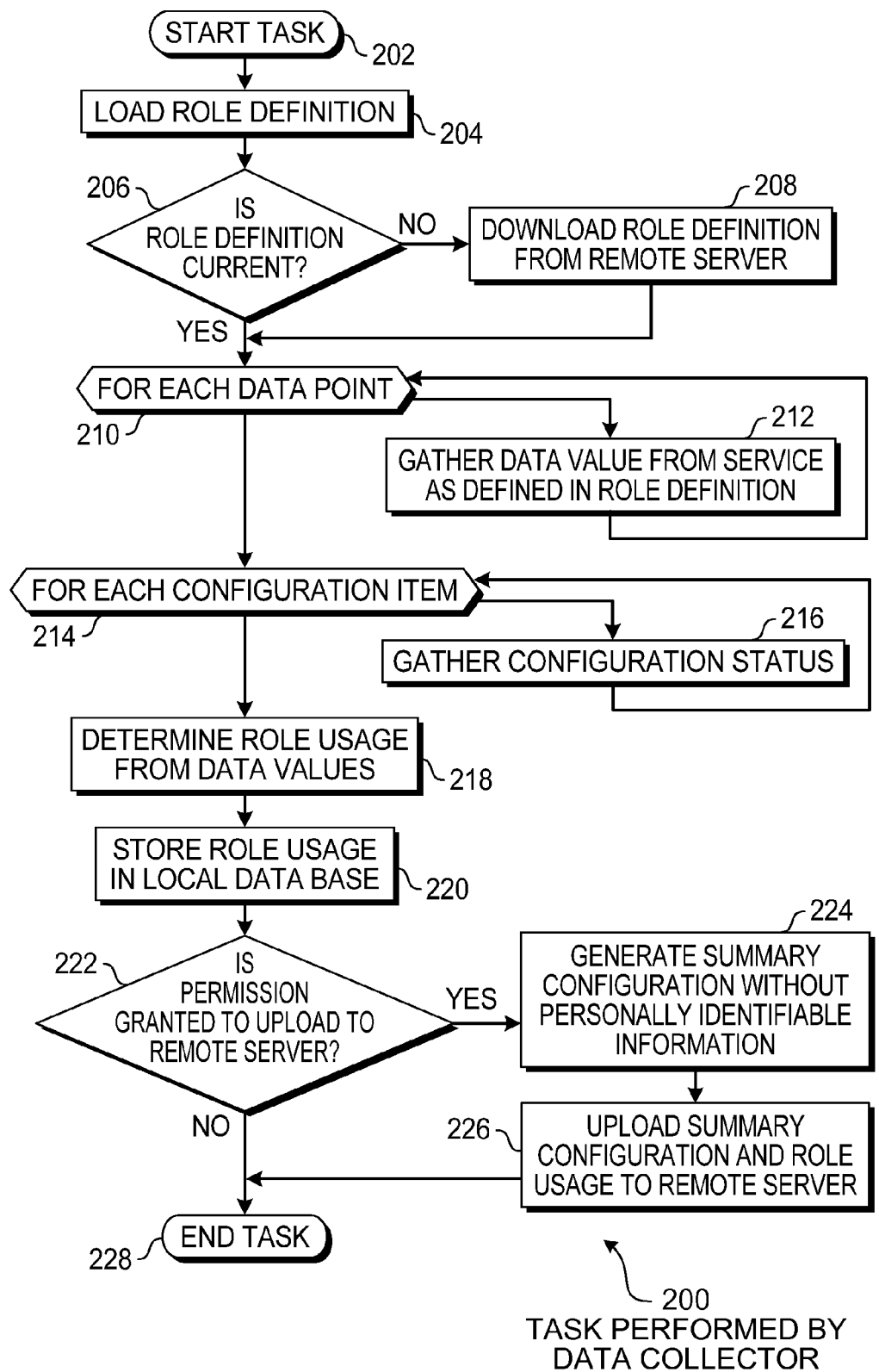
FIG. 2 is a flowchart illustration of an embodiment showing a method that may be performed by a data collector.

FIG. 2 is a flowchart illustration of an embodiment 200 showing a method for gathering data, determining role usage, and transmitting role usage and configuration information when permission exists. Embodiment 200 is a simplified example of some of the steps that may be performed by a data collector 104 as described in embodiment 100.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

Embodiment 200 is a simplified example of a process that may be launched and performed on a periodic basis. In many embodiments, a periodicity and jitter may be defined for the recurring performance of embodiment 200. In such embodiments, embodiment 200 may be defined as a task that is launched by a scheduling mechanism. The task may be started in block 202.

A role definition may be loaded in block 204. In some embodiments, the role definition may be an XML file or other human readable configuration file. The role definition may include many different data elements that may be used by a data collector. For example, the data points and mechanisms for gather data point values may be defined in the role definition. Also, specific configuration parameters and mechanisms for determining configuration parameters may be defined in the role definition.

The role definition may also define roles and role usage values. For example, the role definition may include heuristics or other definitions that may be used to determine qualitative values for specific roles. An example of such a heuristic may be a web server usage of low as being less than 100 GET requests processed per day, while medium usage being between 100 and 1000 GET requests processed per day, and high usage being greater than 1000 GET requests processed per day.

In many embodiments, the role definition may include definitions for many different roles. In some embodiments, each role definition may include information for only one role. In such embodiments, multiple role definitions may be loaded in block 204.

If the role definition is not current in block 206, an updated role definition may be downloaded from a remote server in block 208. In block 206, a query may be made to a remote server to determine a checksum, timestamp, or other identifier for the current role definition. If the data received from the remote server is different from the locally stored role definition, an updated role definition may be downloaded in block 208.

In some embodiments, a remote server may push updated role definitions to a system on which a data collector operates. In such an embodiment, the remote server may transmit the updated role definitions using various messaging mechanisms such as email. In some embodiments, the remote server may push an indicator that an updated version of the role definition is available, but may enable the data collector to pull the updated version the next time the data collector is executed.

For each data point from the role definition in block 210, a data value may be gathered as defined in the role definition in block 212. In many embodiments, the role definition that is loaded in block 204 may be analyzed to gather each data point for which a value may be used.

Within the role definition, each data point may have a mechanism by which the data value may be collected. For example, a data point may include a database query that may be run against a database to determine the data value. In another example, an application programming interface (API) call may be defined that may return a data value. In some cases, the role definition may define some processing, normalization, calculation, comparison, or other operations that may be performed to convert raw data received into a data value.

For each configuration item in block 214, the configuration status may be gathered in block 216. In many cases, a hardware or software configuration may not change from one operation of a data collector to another. In such cases, the configuration status in block 216 may be gathered when a flag or other indicator indicates that such a configuration has changed.

In some embodiments the data values gathered in block 212 and configuration status gathered in block 216 may be gathered from a database populated by a network monitoring system. A network monitoring system may continually gather performance data, operational data, error conditions, configuration data, and other information from one or more devices connected to a network. In some cases, each device may have a locally operating agent or service that collects information and communicates with the network monitoring system to transmit the collected information.

The data values gathered in block 212 may be used to determine role usage in block 218. Role usage may be qualitative evaluations of usage for specific business functions. In some cases, a business function may consist of multiple software and hardware components that operate together.

One example of such a business function may be a firewall. The firewall may control messages passed across a network boundary, such as between a local area network and a wide area network such as the Internet. The firewall may have functions such as Network Address Translation (NAT), malware scanning, message logging, and other functions. Each of the various firewall functions may be performed by different services, applications, or hardware components. Each function may have configuration settings as well as usage information from which a role usage may be computed or determined.

After the role usage is determined in block 218, the role usage may be stored in a local database in block 220. In many cases, a network administrator may use the role usage information for various network management and troubleshooting operations.

If permission has been granted in block 222 to upload data to a remote server, summary configuration data may be generated in block 224 without personally identifiable information, and the summary configuration and role usage information may be uploaded to the remote server in block 226.

In many embodiments, a permission gathering system may be in place that may permit or deny the transmission of data collected in block 212 and 216. The permission gathering system may have a default setting that does not allow data to be collected and transmitted to a remote server, but may allow such data to be transmitted when an authorized user has affirmatively allowed the data collection.

The permission gathering system may permit or deny access to data collected from individual devices or from any device connected to a local area network. In some cases, the permission gathering system may permit data to be transmitted for specific roles and not for others.

The role usage and configuration information may be used for several different purposes on the remote server. In one use scenario, a software manufacturer may use a data collection system to determine which features or components of a software system are actually put to use by customers and how frequently those features are used. Such information may be useful when planning new product releases, for example, or for verifying compliance with a beta test program, for example.

In another usage scenario, the role usage information may be used by a pay-per-use system. In such a system, a software purchaser may pay different fees based on the usage of certain features within a software system or based on the role usage determined for the overall software system.

In some embodiments, a data collector may compare previous configuration settings and role usage information to determine if one or more configuration values or role usage values has changed. In such an embodiment, the data collector may transmit those values that have changed since the last evaluation.

The foregoing description of the subject matter has been presented for purposes of illustration and description. It is not intended to be exhaustive or to limit the subject matter to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments except insofar as limited by the prior art.

What is claimed is:

1. A method comprising:
   receiving a role definition, said role definition relating to a business function comprising a plurality of software components, said role definition comprising a plurality of data points;
   defining a collection schedule, said collection schedule having a predefined periodicity and jitter;
   for at least some of each of said data points, collecting at least one data value from at least one device;
   determining a role usage based on said role definition using said data values;
   determining that permission exists to transmit said role usage to a server accessible over a wide area network; and
   transmitting said role usage to said server.

2. The method of claim 1, said data points being collected at least in part from a performance counter system.

3. The method of claim 1, said data values being collected at least in part from a DHCP monitoring system.

4. The method of claim 1, said data values being collected at least in part from a network services management system.

5. The method of claim 1, said data values being collected at least in part from a file server resource management system.

6. The method of claim 1, at least one of said data points being collected from a remote device.

7. The method of claim 6, said remote device being accessible within a local area network.

8. The method of claim 6, said data point being collected from a database populated by a monitoring system.

9. The method of claim 6, said permission including permission to access said data points from said remote device.

10. The method of claim 6, said remote device having a second permission.

11. The method of claim 1 further comprising:
    determining configuration information related to said role.

12. The method of claim 11, said configuration information comprising hardware configuration information and software configuration information.

13. The method of claim 1, said role usage being determined by a heuristic.

14. A system comprising:
    a processor;
    a task having a schedule, said task being configured to launch a data collector application;
    a role definition relating to a business function comprising a plurality of software components, said role definition comprising a plurality of data points;

said data collector application operable on said processor and being configured to:
 receive a role definition, said role definition relating to a business function comprising a plurality of software components, said role definition comprising a plurality of data points;
 for each of said data points, collect at least one data value;
 determine a role usage based on said role definition using said data values;
 determine that permission exists to transmit said role usage to a server accessible over a wide area network; and
 transmit said role usage to said server.

15. The system of claim 14, at least one of said data values being collected from a database populated by a monitoring system.

16. The system of claim 14, at least one of said data values being collected from a remote service.

17. A system comprising:
 a permission collection mechanism configured to receive a user input authorization to share role usage and configuration data with a remote server;
 a role definition comprising a heuristic having input data points from a plurality of sources, said sources comprising software components, said role definition being related to a business function performed by a device;
 a monitoring system configured to collect status and configuration data from a plurality of devices connected to a local area network and populate a configuration database;
 a scheduling system configured to launch a data collector application based on a predetermined schedule;
 said data collector application configured to:
  determine a set of data points for which data values are to be collected;
  collect data values for at least a portion of said data points from said database;
  collect configuration information relating to said software components;
  determine said role usage using said heuristic and data values; and
  transmit said role usage and said configuration data to said remote server.

18. The system of claim 17, said user input authorization comprising permission to share said role usage and configuration data to a plurality of devices.

19. The system of claim 17, said predetermined schedule having a predetermined periodicity and jitter.

20. The system of claim 17, said configuration data comprising software configuration and hardware configuration.

* * * * *